United States Patent
Pratten et al.

(10) Patent No.: US 12,380,494 B2
(45) Date of Patent: *Aug. 5, 2025

(54) SYSTEM AND METHOD FOR REAL-TIME CHEQUE PROCESSING AND RETURN AT AN AUTOMATED TELLER MACHINE

(71) Applicant: The Toronto-Dominion Bank, Toronto (CA)

(72) Inventors: A. Warren Pratten, London (CA); Anthony Wayne Miles, London (CA); Graham Allan Anderson, Guelph (CA); Tristan Rodzen, Norway, ME (US); David H. Schleicher, Haddon Township, NJ (US); Robert John Farmer, Pittstown, NJ (US); Giovanni Favretto, Newmarket (CA); Chico Chi-Kuo Lam, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,532

(22) Filed: Nov. 23, 2023

(65) Prior Publication Data

US 2024/0087010 A1 Mar. 14, 2024

Related U.S. Application Data

(63) Continuation of application No. 17/692,331, filed on Mar. 11, 2022, now Pat. No. 11,875,398.

(51) Int. Cl.
*G06Q 40/02* (2023.01)
*G06Q 20/10* (2012.01)

(52) U.S. Cl.
CPC ......... *G06Q 40/02* (2013.01); *G06Q 20/1085* (2013.01)

(58) Field of Classification Search
CPC .................. G06Q 40/02; G06Q 20/1085
See application file for complete search history.

(56) References Cited

U.S. PATENT DOCUMENTS

| 7,257,246 B1 | 8/2007 | Brodie |
| 7,438,219 B1 * | 10/2008 | Crews .................. G07F 19/202 235/375 |

(Continued)

OTHER PUBLICATIONS

"Office of State Attorney, What is a Worthless Check?" https://www.sao2fl.org/Worthless-Checks, Dec. 1, 2021 (Year: 2021).*

(Continued)

*Primary Examiner* — Elda G Milef
(74) *Attorney, Agent, or Firm* — Rowand LLP (57) ABSTRACT

An automated teller machine comprises a communications module; an image module; a processor; and a memory coupled to the processor storing instructions that, when executed by the processor, configure the processor to receive a first cheque for deposit; engage the image module to capture an image of the first cheque; send, via the communications module and to a server computer system, a signal that includes the image of the first cheque for acceptance; send, via the communications module and to an automated teller machine switch, a signal that includes a request for transaction authorization approval based on the first cheque; receive, via the communications module and from the server computer system, a signal that includes an indication of acceptance of the image of the first cheque; receive, via the communications module and from the automated teller machine switch, a signal that includes an indication of approval of the request for the transaction authorization based on the first cheque; and responsive to receiving the signal that includes the indication of acceptance of the image (Continued)

of the first cheque and the signal that includes the indication of approval of the request for the transaction authorization, return the first cheque.

20 Claims, 8 Drawing Sheets

(56) References Cited

U.S. PATENT DOCUMENTS

| | | | |
|---|---|---|---|
| 10,262,360 B2 * | 4/2019 | McKenna | G06Q 20/10 |
| 10,290,052 B1 | 5/2019 | Quesenberry | |
| 2003/0116478 A1 | 6/2003 | Laskowski | |
| 2007/0058851 A1 | 3/2007 | Quine | |
| 2007/0084911 A1 * | 4/2007 | Crowell | G06Q 20/042 |
| | | | 235/379 |
| 2018/0253599 A1 | 9/2018 | Shepard | |
| 2019/0295048 A1 * | 9/2019 | Delker | G06Q 20/042 |
| 2021/0090043 A1 | 3/2021 | Mattison | |
| 2022/0270058 A1 * | 8/2022 | Suarez | G06N 20/00 |

OTHER PUBLICATIONS

CIPO; Examiner's Report relating to CA Application No. 3,152,561 dated Dec. 20, 2024.

* cited by examiner

SYSTEM AND METHOD FOR REAL-TIME CHEQUE PROCESSING AND RETURN AT AN AUTOMATED TELLER MACHINE

CROSS-REFERENCE TO RELATED APPLICATIONS

This application is a continuation of U.S. patent application Ser. No. 17/692,331, filed on Mar. 11, 2022, the entire contents of which are incorporated herein by reference.

TECHNICAL FIELD

The present application relates to handling cheques received for deposit at an automated teller machine (ATM), and more particularly, to systems and methods for real-time cheque processing and return at an ATM.

BACKGROUND

Automated teller machines (ATMs) allow certain banking activities to be performed without resort to a human teller. For example, deposits may be made and fulfilled by inserting cheques into an ATM.

When a cheque is inserted into an ATM and the deposit is fulfilled, the ATM retains the cheque and places it in a deposit bin which may be referred to as a cassette. The cassette may be cleared by an armoured car carrier. Deposited cheques held in the cassette and cleared by the armoured car carrier are taken to a facility for safe keeping and can be later pulled in the event of a dispute.

This process is laboursome and inefficient.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Accordingly, in one aspect there is provided an automated teller machine comprising a communications module; an image module; a processor; and a memory coupled to the processor storing instructions that, when executed by the processor, configure the processor to receive a first cheque for deposit; engage the image module to capture an image of the first cheque; send, via the communications module and to a server computer system, a signal that includes the image of the first cheque for acceptance; send, via the communications module and to an automated teller machine switch, a signal that includes a request for transaction authorization approval based on the first cheque; receive, via the communications module and from the server computer system, a signal that includes an indication of acceptance of the image of the first cheque; receive, via the communications module and from the automated teller machine switch, a signal that includes an indication of approval of the request for the transaction authorization based on the first cheque; and responsive to receiving the signal that includes the indication of acceptance of the image of the first cheque and the signal that includes the indication of approval of the request for the transaction authorization, return the first cheque.

In one or more embodiments, the instructions, when executed by the processor, further configure the processor to, responsive to receiving the signal that includes the indication of acceptance of the image of the first cheque, mark the first cheque with an identifier associated with image acceptance.

In one or more embodiments, the instructions, when executed by the processor, further configure the processor to, responsive to receiving the signal that includes the indication of approval of the request for the transaction authorization, mark the first cheque with an identifier associated with transaction approval.

In one or more embodiments, the instructions, when executed by the processor, further configure the processor to receive a second cheque for deposit; engage the image module to capture an image of the second cheque; send, via the communications module and to the server computer system, a signal that includes the image of the second cheque for acceptance; send, via the communications module and to the automated teller machine switch, a signal that includes a request for transaction authorization approval based on the second cheque; receive, via the communications module and from the server computer system, a signal that includes an indication of rejection of the image of the second cheque; send, via the communications module and to the automated teller machine switch, a signal that includes a request to cancel or reverse the transaction authorization approval based on the second cheque; and return the second cheque.

In one or more embodiments, the instructions, when executed by the processor, further configure the processor to, responsive to receiving the signal that includes the indication of rejection of the image of the second cheque, mark the second cheque with an identifier associated with image rejection.

In one or more embodiments, the instructions, when executed by the processor, further configure the processor to receive a third cheque for deposit; engage the image module to capture an image of the third cheque; send, via the communications module and to the server computer system, a signal that includes the image of the third cheque for acceptance; send, via the communications module and to the automated teller machine switch, a signal that includes a request for transaction authorization approval based on the third cheque; determine that sending, via the communications module and to the server computer system, the signal that includes the image of the third cheque has timed out;

send, via the communications module and to the automated teller machine switch, a signal that includes a request to cancel or reverse the transaction authorization approval based on the third cheque; and return the third cheque.

In one or more embodiments, the instructions, when executed by the processor, further configure the processor to, responsive to determining that sending the signal that includes the image of the third cheque has timed out, mark the third cheque with an identifier associated with image failure.

In one or more embodiments, the instructions, when executed by the processor, further configure the processor to receive a fourth cheque for deposit; engage the image module to capture an image of the fourth cheque; send, via the communications module and to the server computer system, a signal that includes the image of the fourth cheque for acceptance; send, via the communications module and to the automated teller machine switch, a signal that includes a request for transaction authorization approval based on the fourth cheque; receive, via the communications module and from the automated teller machine switch, a signal that includes an indication of rejection or failure of the request for the transaction authorization based on the fourth cheque; send, via the communications module and to server computer system, a signal that includes a request to cancel acceptance of the image of the fourth cheque; and return the fourth cheque.

In one or more embodiments, the instructions, when executed by the processor, further configure the processor to responsive to receiving the signal that includes the indication of rejection or failure of the request for the transaction authorization based on the fourth cheque, mark the fourth cheque with an identifier associated with rejection or failure of the request for the transaction authorization.

In one or more embodiments, when capturing the image of the first cheque, the instructions, when executed by the processor, further configure the processor to engage an optical character recognition module to obtain metadata associated with the first cheque, wherein the signal that includes the image of the first cheque includes the metadata.

According to another aspect there is provided a computer-implemented method executed by a processor of an automated teller machine, the method comprising receiving a first cheque for deposit; engaging an image module to capture an image of the first cheque; sending, via a communications module and to a server computer system, a signal that includes the image of the first cheque for acceptance; sending, via the communications module and to an automated teller machine switch, a signal that includes a request for transaction authorization approval based on the first cheque; receiving, via the communications module and from the server computer system, a signal that includes an indication of acceptance of the image of the first cheque; receiving, via the communications module and from the automated teller machine switch, a signal that includes an indication of approval of the request for the transaction authorization based on the first cheque; and responsive to receiving the signal that includes the indication of acceptance of the image of the first cheque and the signal that includes the indication of approval of the request for the transaction authorization, returning the first cheque.

In one or more embodiments, the method further comprises responsive to receiving the signal that includes the indication of acceptance of the image of the first cheque, marking the first cheque with an identifier associated with image acceptance.

In one or more embodiments, the method further comprises responsive to receiving the signal that includes the indication of approval of the request for the transaction authorization, marking the first cheque with an identifier associated with transaction approval.

In one or more embodiments, the method further comprises receiving a second cheque for deposit; engaging the image module to capture an image of the second cheque; sending, via the communications module and to the server computer system, a signal that includes the image of the second cheque for acceptance; sending, via the communications module and to the automated teller machine switch, a signal that includes a request for transaction authorization approval based on the second cheque; receiving, via the communications module and from the server computer system, a signal that includes an indication of rejection of the image of the second cheque; sending, via the communications module and to the automated teller machine switch, a signal that includes a request to cancel or reverse the transaction authorization approval based on the second cheque; and returning the second cheque.

In one or more embodiments, the method further comprises responsive to receiving the signal that includes the indication of rejection of the image of the second cheque, marking the second cheque with an identifier associated with image rejection.

In one or more embodiments, the method further comprises receiving a third cheque for deposit; engaging the image module to capture an image of the third cheque; sending, via the communications module and to the server computer system, a signal that includes the image of the third cheque for acceptance; sending, via the communications module and to the automated teller machine switch, a signal that includes a request for transaction authorization approval based on the third cheque; determining that sending, via the communications module and to the server computer system, the signal that includes the image of the third cheque has timed out; sending, via the communications module and to the automated teller machine switch, a signal that includes a request to cancel or reverse the transaction authorization approval based on the third cheque; and returning the third cheque.

In one or more embodiments, the method further comprises responsive to determining that sending the signal that includes the image of the third cheque has timed out, marking the third cheque with an identifier associated with image failure.

In one or more embodiments, the method further comprises receiving a fourth cheque for deposit; engaging the image module to capture an image of the fourth cheque; sending, via the communications module and to the server computer system, a signal that includes the image of the fourth cheque for acceptance; sending, via the communications module and to the automated teller machine switch, a signal that includes a request for transaction authorization approval based on the fourth cheque; receiving, via the communications module and from the automated teller machine switch, a signal that includes an indication of rejection or failure of the request for the transaction authorization based on the fourth cheque; sending, via the communications module and to the automated teller machine switch, a signal that includes a request to cancel acceptance of the image of the fourth cheque; and returning the fourth cheque.

In one or more embodiments, the method further comprises responsive to receiving the signal that includes the indication of rejection or failure of the request for the transaction authorization based on the fourth cheque, marking the fourth cheque with an identifier associated with rejection or failure of the request for the transaction authorization.

According to another aspect there is provided a non-transitory computer-readable storage medium storing instructions that, when executed by a processor of an automated teller machine, cause the automated teller machine to receive a first cheque for deposit; engage an image module to capture an image of the first cheque; send, via a communications module and to a server computer system, a signal that includes the image of the first cheque for acceptance; send, via the communications module and to an automated teller machine switch, a signal that includes a request for transaction authorization approval based on the first cheque; receive, via the communications module and from the server computer system, a signal that includes an indication of acceptance of the image of the first cheque; receive, via the communications module and from the automated teller machine switch, a signal that includes an indication of approval of the request for the transaction authorization based on the first cheque; and responsive to receiving the signal that includes the indication of acceptance of the image of the first cheque and the signal that includes the indication of approval of the request for the transaction authorization, return the first cheque.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

Figure 1:
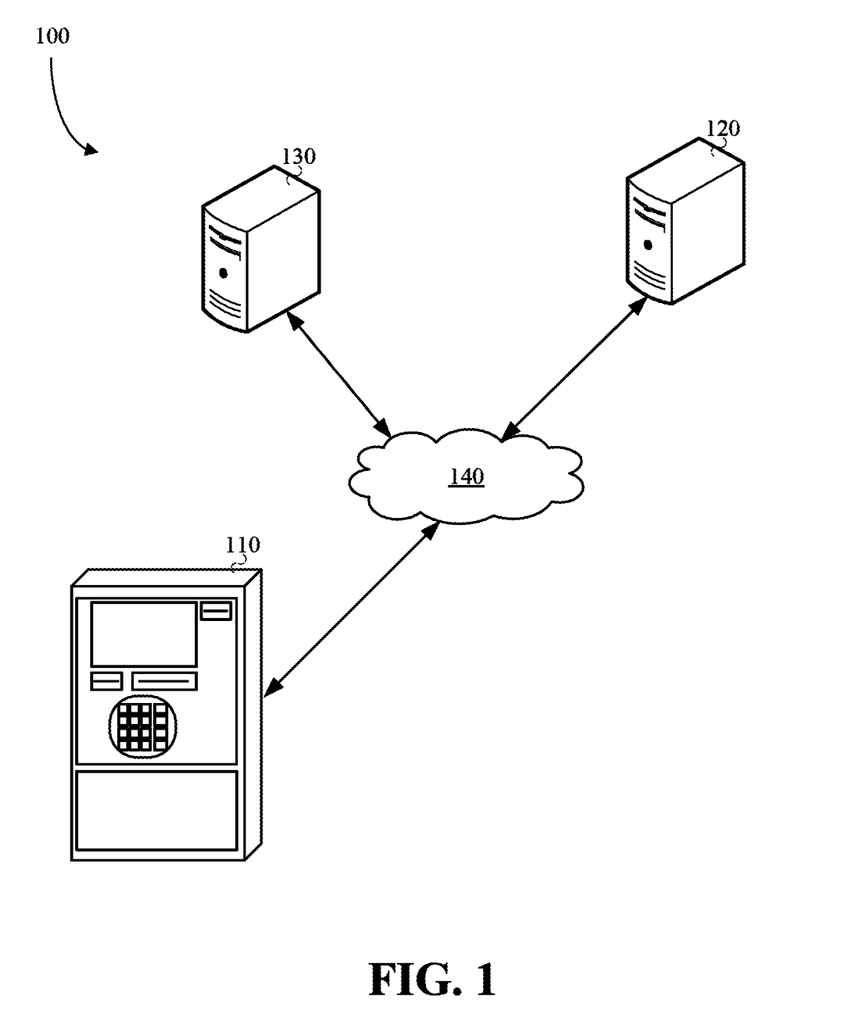
FIG. 1 is a schematic operation diagram illustrating an operating environment of an example embodiment.

FIG. 1 is a schematic operation diagram illustrating an operating environment of an example embodiment. As shown, a system 100 includes an automated teller machine 110, an automated teller machine switch 120, and a server computer system 130 coupled to one another through a network 140, which may include a public network such as the Internet and/or a private network. The automated teller machine 110, the automated teller machine switch 120, and the server computer system 130 may be in geographically disparate locations. Put differently, the automated teller machine 110, the automated teller machine switch 120, and the server computer system 130 may be located remote from one another.

The automated teller machine 110 may be associated with a financial institution. The automated teller machine 110 is adapted to provide access to banking services such as, for example, withdrawals and deposits. The automated teller machine 110 is configured to capture images of at least some of the value instruments it receives. As such, the automated teller machine 110 may be referred to as an "envelope-free" automated teller machine.

The automated teller machine switch 120 and the server computer system 130 are computer server systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The automated teller machine switch 120 may be adapted to broker (e.g., relay) communication between the automated teller machine 110 and a payment network (not shown). The automated teller machine switch 120 may perform operations related to performing transactions using the automated teller machine 110. For example, the automated teller machine switch 120 may perform operations related to authorizing and/or completing transactions based on cheques deposited at the automated teller machine 110. The automated teller machine switch 120 may additionally or alternatively perform operations related to authenticating a user of the automated teller machine 110. For example, the automated teller machine switch 120 may perform operations to authenticate a user based on data from a card used to access the automated teller machine 110 and based on a personal identification number (PIN) received as input by the automated teller machine 110.

The server computer system 130 may be associated with a financial institution and the financial institution may be the same financial institution associated with the automated teller machine 110. The server computer system 130 and may perform operations to provide services to the financial institution. As will be described in more detail below, the services may include receiving images of cheques deposited at the automated teller machine 110, performing operations to accept the images, and storing the images in one or more databases.

The network 140 is a computer network. In some embodiments, the network 140 may be an internetwork such as may be formed of one or more interconnected computer networks. For example, the network 140 may be or may include an Ethernet network, an asynchronous transfer mode (ATM) network, a wireless network, a telecommunications network, or the like.

Figure 2:
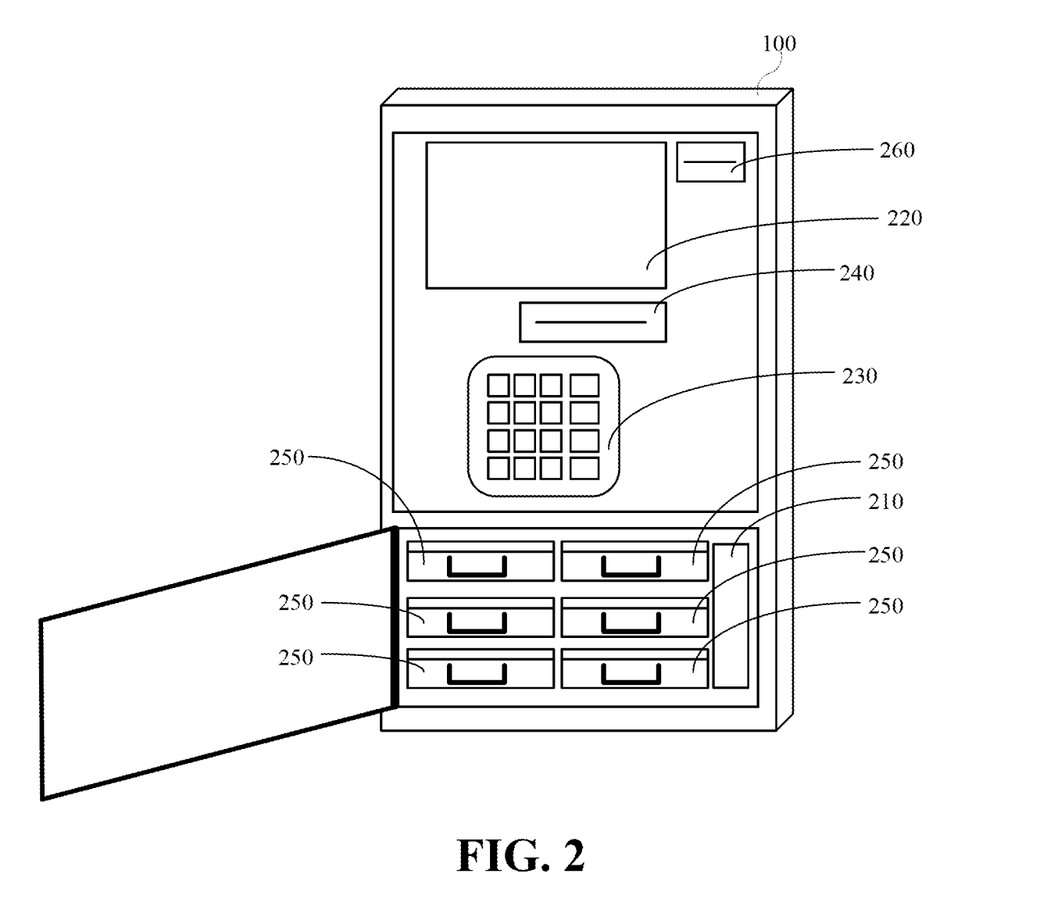
FIG. 2 is a simplified diagram showing components of an example automated teller machine.

FIG. 2 illustrates example components of the automated teller machine 110. The automated teller machine 110 is adapted to provide access to banking services such as for example withdrawals and deposits. As shown in FIG. 2, the automated teller machine 110 includes a controller 210, a display 220, a keypad 230, an item receiver/dispenser 240, cassettes 250, and a card reader 260.

As further described below, the controller 210 is a computing device. For example, the controller 210 may include a processor that executes instructions retrieved from a computer-readable medium thereby causing the automated teller machine 110 to perform operations for providing access to banking services.

The display 220 may for example, be a liquid-crystal display (LCD), a cathode-ray tube (CRT), or the like. The display 220 may present a user interface to a user of the automated teller machine 110.

The keypad 230 is an input device allowing input to be provided to the automated teller machine 110. Input received via the keypad 230 may be conveyed to the controller 210. The keypad 230 may be used by a user to provide a personal identification number (PIN) to the automated teller machine 110 as a part of authenticating to the automated teller machine 110.

The item receiver/dispenser 240 is a device allowing value instruments to be received by the automated teller machine 110 or dispensed by the automated teller machine 110. The value instruments may include banknotes and/or cheques. The item receiver/dispenser 240 may provide a single slot through which value instruments may be dispensed. Additionally or alternatively, the item receiver/dispenser 240 may provide multiple slots. It may be that components or units of the item receiver/dispenser 240 are specialized to a particular type or types of value instrument. For example, a particular component or unit of the item receiver/dispenser 240 may be adapted to receiving and/or dispensing banknotes of one denomination, while another component or unit may be adapted to receiving and/or dispensing banknotes of another denomination. Alternatively, it may be that the item receiver/dispenser 240 is a monolithic unit that handles all manner of value instruments.

In one or more embodiments, the item receiver/dispenser 240 may be configured to receive a cheque and to dispense the same cheque once the automated teller machine 110 has performed simultaneous operations to send an image of the cheque to the server computer system 130 and to obtain transaction authorization approval from the automated teller machine switch 120.

As mentioned above, the automated teller machine includes one or more cassettes 250. The item receiver/dispenser 240 may be in communication with the cassettes 250. Some or all of the cassettes 250 may be adapted to dispense value instruments. For example, some of the cassettes 250 may be for dispensing banknotes of particular denominations.

The item receiver/dispenser 240 and the cassettes 250 may be collectively considered a value instrument dispenser adapted to dispense value instruments such as to satisfy withdrawals from the automated teller machine 110.

The card reader 260 allows data to be read from a card or access card such as for example a common ISO-sized ATM or cheque card. For example, the card reader 260 may allow data to be read from magnetic stripe cards and/or chip cards. In some embodiments, the card reader 260 may require a card to be swiped through it to be read (a so-called "swipe reader") and/or it may allow a card to be inserted into it for reading (a so-called "dip reader"). In some embodiments, the card reader 260 may be adapted to allow inserted cards to be retained by the automated teller machine 110 indefinitely (such as if fraud is suspected) and/or for the period of a session.

Figure 3:
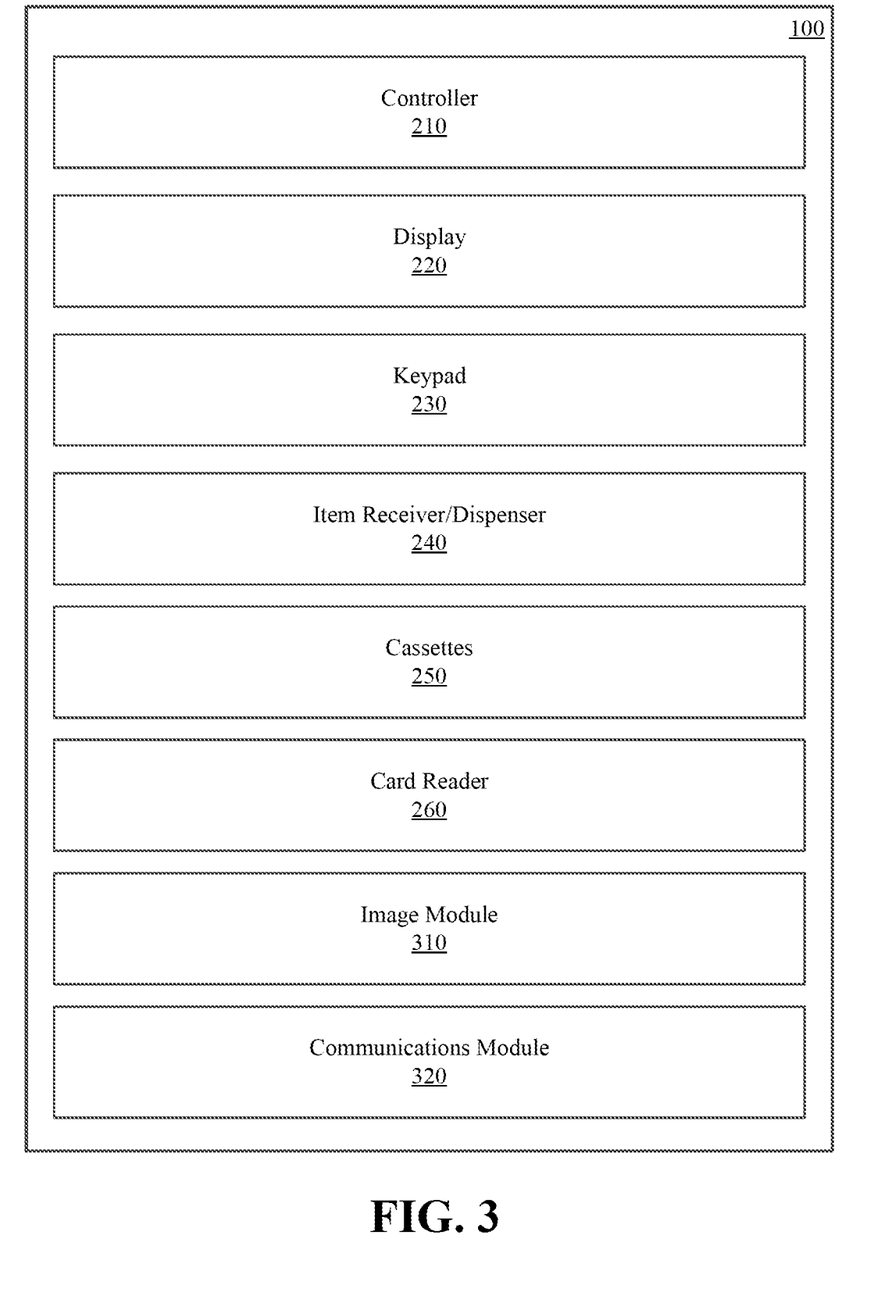
FIG. 3 is a logical block diagram of the example automated teller machine of FIG. 2.

FIG. 3 is a logical block diagram of the automated teller machine 110. As described above, the automated teller machine 110 may include a controller 210, a display 220, a keypad 230, an item receiver/dispenser 240, cassettes 250, and a card reader 260 as described above. Additionally, as shown in FIG. 3, the automated teller machine 110 may include an image module 310 and a communications module 320.

The image module 310 is adapted to scan or capture images of value instruments received by the automated teller machine 110. For example, the image module 310 may scan or capture images of value instruments (such as, for example, bank notes, negotiable instruments like cheques, money orders, bank drafts, warrants of payment, etc.) as they are received by the automated teller machine 110 such as, for example, by way of the item receiver/dispenser 240. The image module 310 may include a colour, black and white, or a grayscale scanner. In one or more embodiments, image module 310 may include an ultraviolet scanner and the ultraviolet scanner may be engaged to identify security features for counterfeit detection. The image module 310 may include a number of scanning technologies. For example, the image module 310 may include a contact image sensor (CIS), a charge-coupled device (CCD), etc.

The communications module 320 allows the automated teller machine 110 to communicate with other computing devices and/or various communications networks such as, for example, the network 140. In other words, the communications module 320 may allow the automated teller machine 110 to send or receive communications signals. Communications signals may be sent or received according to one or more protocols or according to one or more standards. For example, the communications module 320 may allow the automated teller machine 110 to communicate via an Ethernet network, an ATM network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 320 may allow the automated teller machine 110 to communicate using near-field communication (NFC), via Wi-Fi™, using Bluetooth™ or via some combination of one or more networks or protocols.

Figure 4:
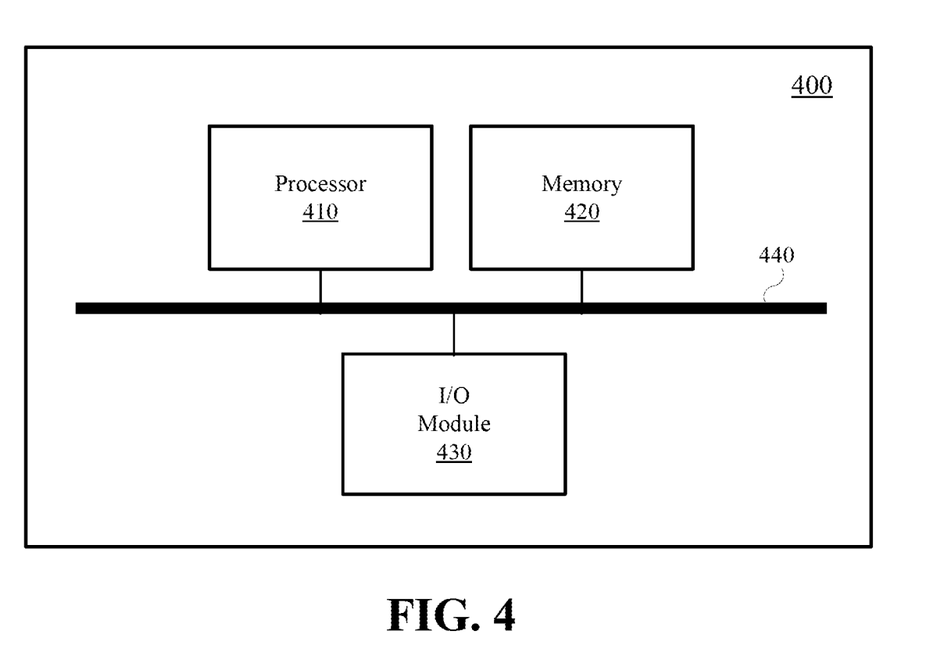
FIG. 4 is a high-level operation diagram of an example computing device.

FIG. 4 is a high-level operation diagram of an example computing device 400. In some embodiments, the example computing device 400 may be exemplary of the controller 210 (FIG. 2), the automated teller machine switch 120 and/or the server computer system 130. As will be described in more detail below, each of the automated teller machine 110, the automated teller machine switch 120 and the server computer system 130 include software that adapts it to perform a particular function.

The example computing device 400 includes a variety of modules. For example, as illustrated, the example computing device 400 may include a processor 410, a memory 420, and an input/output (I/O) module 430. As illustrated, the foregoing example modules of the example computing device 400 are in communication over a bus 440.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computing device 400.

The I/O module 430 allows the example computing device 400 to interact with devices such as, for example, peripherals to send and receive data. The I/O module 430 may, for example, allow the example computing device 400 to interface with input devices such as, for example, keypads, keyboards, pointing devices, and the like. In another example, the I/O module 430 may, for example, allow the example computing device 400 to interface with output devices such as, for example, displays, printers, and the like. In a particular example, where the example computing device 400 forms a part of the automated teller machine 110 (FIG. 1) such as, for example, if the example computing device 400 is or forms a part of the controller 210 (FIG. 2) of the automated teller machine 110, the I/O module 430 may allow the example computing device 400 to interface with, for example, one or more of the display 220, the keypad 230, the item receiver/dispenser 240, cassettes 250, the card reader 260, the image module 310 and/or the communications module 320.

Software comprising instructions is executed by the processor 410 from a computer-readable medium. For example, software may be loaded into random-access memory from persistent storage of the memory 420. Additionally, or alternatively, instructions may be executed by the processor 410 directly from read-only memory of the memory 420.

Figure 5:
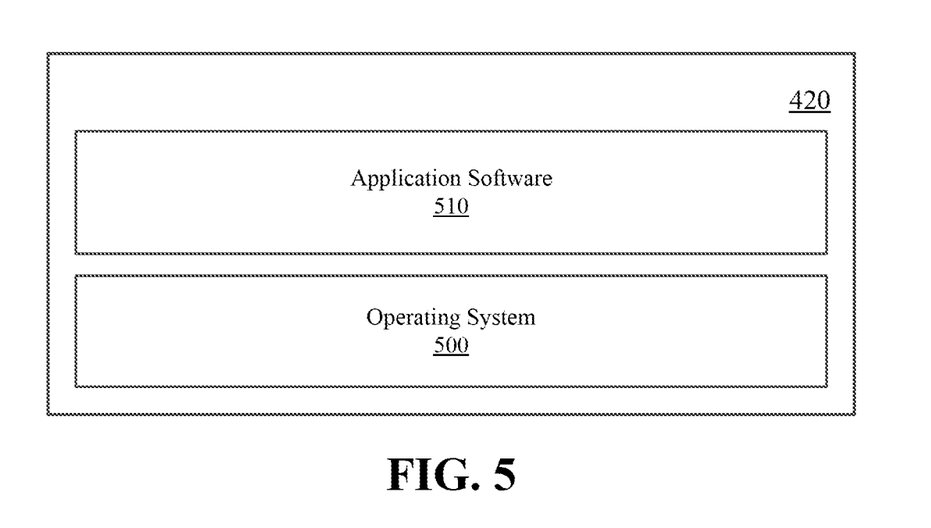
FIG. 5 depicts an example simplified software organization of the example computing device of FIG. 4.

FIG. 5 depicts a simplified organization of software components stored in the memory 420 of the example computing device 400 (FIG. 4). As illustrated, these software components include an operating system 500 and application software 510.

The operating system 500 is software. The operating system 500 allows the application software 510 to access the processor 410, the memory 420, and the I/O module 430 of the example computing device 400 (FIG. 4). The operating system 500 may be, for example, Google™ Android™, Apple™ iOS™, UNIX™, Linux™, Microsoft™ Windows™, Apple OSX™ or the like.

The application software 510 adapts the example computing device 400, in combination with the operating system 500, to operate as a device performing a particular function. For example, the application software 510 may cooperate with the operating system 500 to adapt a suitable embodiment of the example computing device 400 to operate as the controller 210 (FIG. 2) of the automated teller machine 110 (FIG. 1).

Operations performed by the automated teller machine 110 will now be described.

The automated teller machine 110 may perform one or more tasks associated with an account. Prior to performing the one or more tasks, the automated teller machine 110 may require a user to authenticate using, for example, an authentication token.

Figure 6:
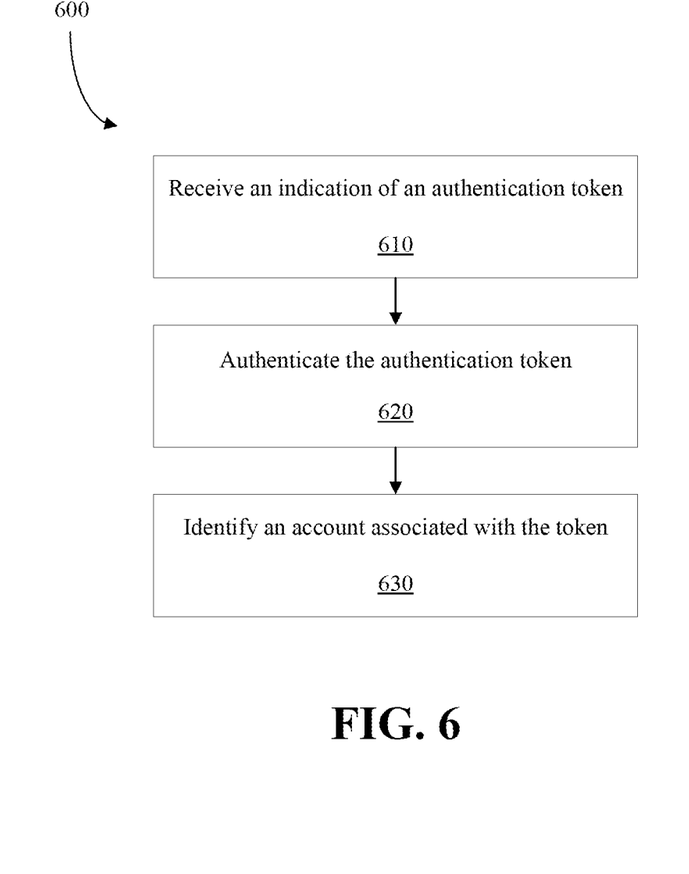
FIG. 6 is a flowchart showing operations performed by an automated teller machine in authenticating according to an embodiment.

Reference is made to FIG. 6, which illustrates, in flowchart form, a method 600 for authenticating. The method 600 may be implemented by a computing device having suitable processor-executable instructions for causing the computing device to carry out the described operations. The method 600 may be implemented, in whole or in part, by the controller 210 of the automated teller machine 110. In one or more embodiments, the controller 210 may offload some of the operations to the automated teller machine switch 120 and/or the server computer system 130.

The method 600 includes receiving an indication of an authentication token (step 610).

In one or more embodiments, the indication of the authentication token may be received via the card reader 260. For example, a card or access card such as for example a common ISO-sized ATM, cheque, credit or debit card may be inserted into the card reader 260.

The method 600 includes authenticating the authentication token (step 620).

The authenticating may require two-factor authentication. For example, in one or more embodiments, the automated teller machine 110 may require the user to enter a PIN associated with the card that was inserted into the card reader 260. The user may enter the PIN using, for example, the keypad 230 of the automated teller machine 110. Responsive to receiving the PIN, the automated teller machine 110 may determine that the PIN is indeed associated or linked with the card.

In some embodiments, the automated teller machine 110 may perform authentication of the authentication token offline, that is, without the automated teller machine 110 communicating with any remote servers. In other embodiments, authentication may involve an online authentication technique in which the automated teller machine 110 communicates with the automated teller machine switch 120 and/or the server computer system 130 via the network 140. In one or more embodiments, the network may be an automated teller machine network such as, for example, the PLUS™ or Interac™ networks. It may be that the automated teller machine 110 acts as a proxy or relay for communications between a remote authentication server responsible for authenticating the authentication token as valid and the authentication token.

The method 600 includes identifying an account associated with the authentication token (step 630).

In one or more embodiments, the automated teller machine 110 may communicate with the authentication token to receive information identifying an account associated with the token. For example, the authentication token may provide a payment account number (PAN) to the automated teller machine 110. In one or more embodiments, the automated teller machine 110 may receive an identifying value from the automated teller machine 110 and may then use that value to perform a look-up to identify an account such as, for example, a bank account number. In a particular example, the automated teller machine 110 may communicate one or more values received from the authentication token and/or determined based on the authentication token to the automated teller machine switch 120 and/or the server computer system 130 and the automated teller machine switch 120 and/or the server computer system 130 may perform one or more look-ups in order to obtain account information and may communicate the account information to the automated teller machine 110. A network such as for example the PLUS™ or Interac™ networks may additionally be used.

Once authentication has been completed, the automated teller machine 110 may perform one or more tasks associated with the account. The tasks may include depositing funds, withdrawing funds, determining an account balance, etc. In one or more embodiments, the automated teller machine 110 may perform operations to deposit funds and this may be done in response to the automated teller machine 110 receiving one or more cheques. To deposit funds based on one or more cheques, the automated teller machine 110 may perform operations for real-time cheque processing and return.

Figure 7:
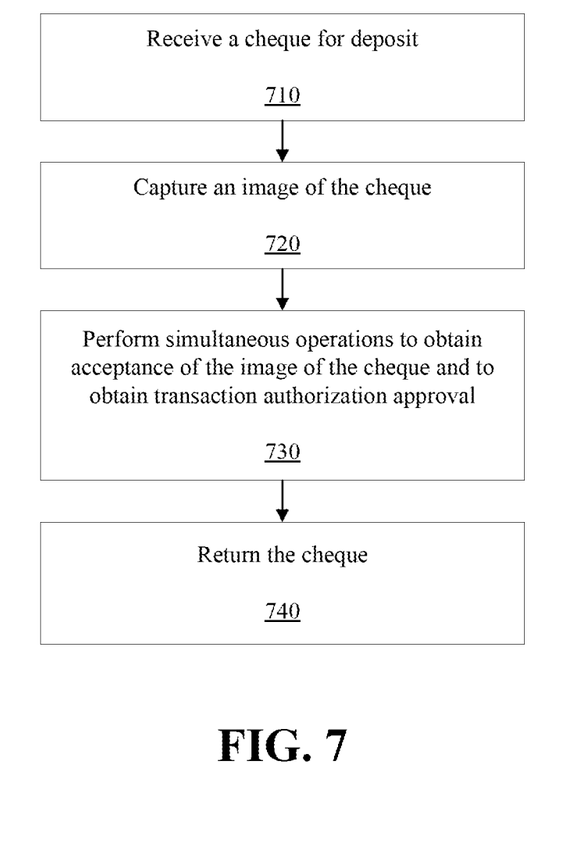
FIG. 7 is a flowchart showing operations performed by an automated teller machine in real-time cheque processing and return at an automated teller machine according to an embodiment.

Reference is made to FIG. 7, which illustrates, in flowchart form, a method 700 for real-time cheque processing and return at an automated teller machine. The method 700 may be implemented by a computing device having suitable processor-executable instructions for causing the computing device to carry out the described operations. The method 700 may be implemented, in whole or in part, by the controller 210 of the automated teller machine 110. In one or more embodiments, the controller 210 may offload some of the operations to the automated teller machine switch 120 and/or the server computer system 130.

The method 700 includes receiving a cheque for deposit (step 710).

The automated teller machine 110 receives the cheque for deposit via the item receiver/dispenser 240. The cheque includes a number of elements for completing the deposit. For example, the cheque includes information identifying the drawer, that is, the person or entity whose transaction account is to be drawn. The information identifying the drawer may include information identifying the drawee such as for example the transit number, institution number, and account number of the account from which the funds are to be drawn. The cheque also includes information that identifies the payee, that is, the person or entity who is to be paid the amount. The cheque also includes an amount, that is, the amount and currency of the transaction. Other information may be included such as for example a date of the cheque, a signature of the drawer, a signature of the payee, etc.

The method 700 includes capturing an image of the cheque (step 720).

The automated teller machine 110, specifically the controller 210, engages the image module 330 to capture an image of the cheque. The image may be a colour image, a black and white image, a grayscale image, etc.

The method 700 includes performing simultaneous operations to obtain acceptance of the image of the cheque and to obtain transaction authorization approval (step 730).

In order to return the cheque to the payee in real-time or near real-time, the automated teller machine 110 performs operations to obtain acceptance of the image of the cheque and to obtain transaction authorization approval. The operations are performed simultaneously or in parallel.

Prior to obtaining acceptance of the image of the cheque and prior to obtaining transaction authorization approval, the image of the cheque may be analyzed to obtain metadata associated with the cheque. In one or more embodiments, the automated teller machine 110 may engage an optical character recognition module to obtain the metadata. The optical character recognition module may analyze the image of the cheque to obtain the metadata and the metadata may include, for example, information identifying the drawer or drawee such as for example the transit number, institution number and account number of the account from which the funds are to be drawn. The metadata may additionally include information that identifies the payee, the amount and currency of the transaction, etc.

Acceptance of the image of the cheque is required to ensure that the financial institution has a sufficient image of the cheque that is being deposited. Put another way, the financial institution must ensure that an image of the cheque is successfully captured and stored before the automated teller machine 110 is able to return the cheque. In one or more embodiments, the automated teller machine 110 may engage the server computer system 130 to obtain acceptance of the image of the cheque.

Figure 8:
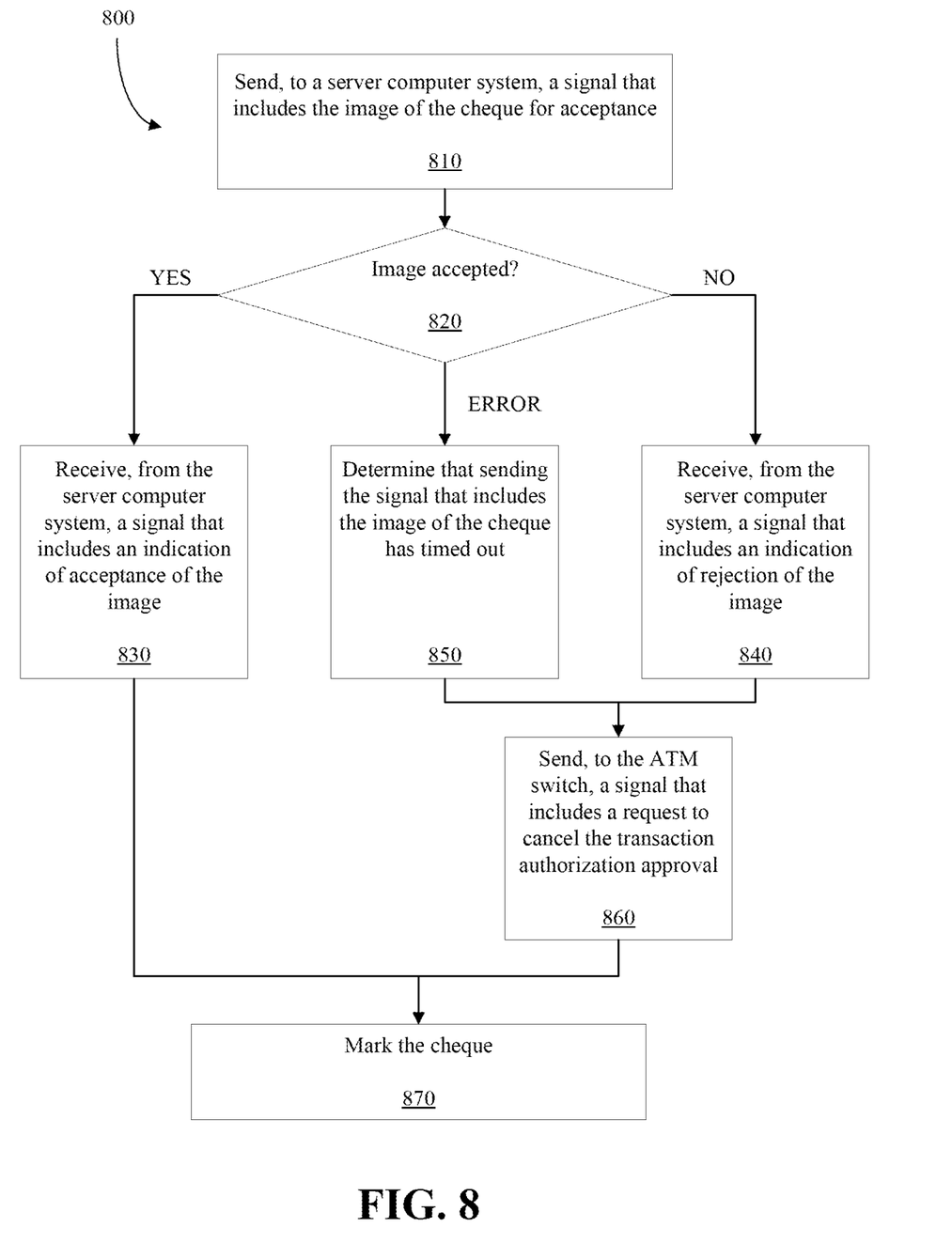
FIG. 8 is a flowchart showing operations performed by an automated teller machine in obtaining acceptance of an image of a cheque according to an embodiment.

Reference is made to FIG. 8, which illustrates, in flowchart form, a method 800 for obtaining acceptance of the image of the cheque. The method 800 may be implemented by a computing device having suitable processor-executable instructions for causing the computing device to carry out the described operations. The method 800 may be implemented, in whole or in part, by the controller 210 of the automated teller machine 110. In one or more embodiments, the controller 210 may offload some of the operations to the automated teller machine switch 120 and/or the server computer system 130.

The method 800 includes sending, to a server computer system, a signal that includes the image of the cheque for acceptance (step 810).

The automated teller machine 110 sends, via the communications module and to the server computer system 130, a signal that includes the image of the cheque. The signal that includes the image of the cheque may additionally include the metadata associated with the cheque.

The method 800 includes determining whether or not the image has been accepted (step 820).

In one or more embodiments, determining whether or not the image has been accepted may be based on an indication received from the server computer system 130. In one or more embodiments, the image may be determined to be accepted by the server computer system 130 upon successful transmission thereto. For example, the server computer system 130 may successfully receive the signal that includes the image and in response the server computer system 130 may send a signal that includes an indication of acceptance of the image.

In one or more embodiments, responsive to receiving the image, the server computer system 130 may perform operations to analyze the image to ensure that the image is of sufficient quality. An image that is of sufficient quality may include an image that is not blurry and/or an image that includes sufficient information to process the deposit. In one or more embodiments, the server computer system 130 may analyze the image to generate metadata and may compare the metadata to that obtained by the automated teller machine 110 to ensure that the metadata matches. The server computer system 130 may determine that the image is acceptable and in response the server computer system 130 may send a signal that includes an indication of acceptance of the image.

Responsive to the server computer system 130 accepting the image, the method 800 includes receiving, from the server computer system, a signal that includes an indication of acceptance of the image of the cheque (step 830).

In response to receiving the signal that includes the indication of acceptance of the image of the cheque, the method 800 proceeds to step 870 (described below).

The server computer system 130 may determine that the image is not acceptable or not of sufficient quality or may determine that transmission of the image has not been successful. In response, the server computer system 130 may send a signal that includes an indication of rejection of the image.

Responsive to the server computer system 130 rejecting the image, the method 800 includes receiving, from the server computer system, a signal that includes an indication of rejection of the image (step 840).

In response to receiving the signal that includes the indication of rejection of the image of the cheque, the method 800 proceeds to step 860 (described below).

In one or more embodiments, the automated teller machine 110 may not receive a signal from the server computer system 130. For example, the automated teller machine 110 may wait for a signal from the server computer system 130 for a predefined amount of time such as for example five (5) seconds, ten (10) seconds, thirty seconds (30), etc. In the event that no signal has been received from the server computer system 130 within the predefined amount of time, the automated teller machine 110 may determine that sending the signal that includes the image of the cheque has timed out. As such, the method 800 includes determining that sending the signal that includes the image of the cheque has timed out (step 850).

Responsive to determining that sending the signal that includes the image of the cheque has timed out, the method 800 proceeds to step 860 (described below).

As mentioned, in response to receiving the signal that includes the indication of rejection of the image of the cheque or in response to determining that sending the signal that includes the image of the cheque has timed out, the automated teller machine 110 performs operations to cancel the transaction authorization approval. As such, the method 800 includes sending, to the automated teller machine switch, a signal that includes a request to cancel the transaction authorization approval (step 860).

The automated teller machine 110 sends the signal that includes the request to cancel the transaction authorization approval to the automated teller machine switch 120. Since operations to obtain acceptance of the image of the cheque and operations to obtain transaction authorization approval are performed simultaneously, the automated teller machine 110 is able to cancel the transaction authorization approval when it is determined that the image of the cheque has been rejected or when it is determined that the request has timed out.

The method 800 includes marking the cheque (step 870).

The cheque may be marked in a manner associated with whether or not the image of the cheque has been accepted. For example, the automated teller machine 110 may stamp the cheque with a first indicator that indicates that the image of the cheque has been accepted, with a second indicator that indicates that the image of the cheque has been rejected, or with a third indicator that indicates that sending the image of the cheque has timed out. In one or more embodiments, the cheque may only be marked by the automated teller machine 110 if the image of the cheque was accepted. In this embodiment, the cheque may be re-inserted into the automated teller machine 110 in an attempt to complete the deposit and this may be done in the event that the image of the cheque was rejected or if sending the image of the cheque timed out. Other examples of marks that may be used to mark the cheque include punching one or more holes in the cheque, printing a visible or invisible watermark on the cheque, etc.

Transaction authorization approval is required to ensure that the deposit of the cheque can be completed and this must be completed before the automated teller machine 110 is able to return the cheque. In one or more embodiments, the automated teller machine 110 may engage the automated teller machine switch 120 to obtain transaction authorization approval.

Figure 9:
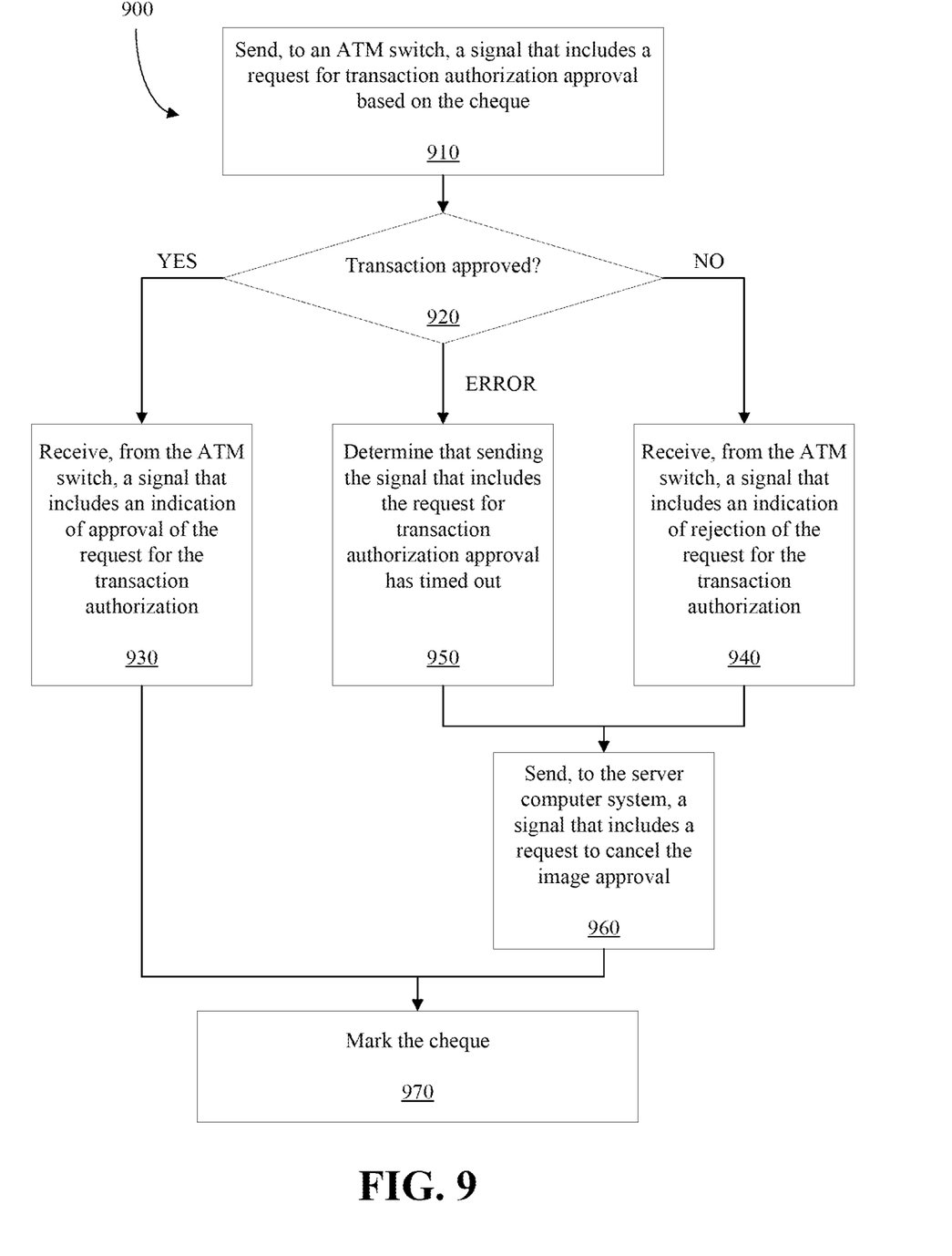
FIG. 9 is a flowchart showing operations performed by an automated teller machine in obtaining transaction authorization approval according to an embodiment.

Reference is made to FIG. 9, which illustrates, in flowchart form, a method 900 for obtaining transaction authorization approval. The method 900 may be implemented by a computing device having suitable processor-executable instructions for causing the computing device to carry out the described operations. The method 900 may be implemented, in whole or in part, by the controller 210 of the automated teller machine 110. In one or more embodiments, the controller 210 may offload some of the operations to the automated teller machine switch 120 and/or the server computer system 130.

The method 900 includes sending, to an automated teller machine switch, a signal that includes a request for transaction authorization approval based on the cheque (step 910).

The automated teller machine 110 sends, via the communications module and to the automated teller machine switch 120, a signal that includes a request for transaction authorization approval based on the cheque. The signal that includes the request for transaction authorization approval may include at least some of the metadata associated with the cheque, for example, the information identifying the drawer or drawee, the amount and the currency.

The method 900 includes determining whether or not the transaction has been approved (step 920).

In one or more embodiments, determining whether or not the transaction has been approved may be based on an indication received from the automated teller machine switch 120. For example, responsive to receiving the request for transaction authorization approval, the automated teller machine switch 120 may perform operations to obtain the transaction authorization. For example, the automated teller machine switch 120 may analyze the metadata to identify the financial institution of the drawer or drawee and may send a signal to a third party server associated with the financial institution of the drawer or drawee to obtain the transaction authorization.

The automated teller machine switch 120 may obtain the transaction authorization and in response the automated teller machine switch 120 may send a signal that includes an indication of approval of the request for the transaction authorization. As such, the method 900 includes receiving, from the automated teller machine switch, a signal that includes an indication of approval of the request for the transaction authorization (step 930).

Responsive to receiving the signal that includes the indication of approval of the request for the transaction authorization, the method 900 proceeds to step 970 (described below).

The automated teller machine switch 120 may receive, from the financial institution of the drawer or drawee, a signal that rejects or otherwise denies the transaction and in response the automated teller machine switch 120 may send a signal that includes an indication of rejection of the request for the transaction authorization. As such, the method 900 includes receiving, from the automated teller machine switch, a signal that includes an indication of rejection of the request for the transaction authorization (step 940).

Responsive to receiving the signal that includes the indication of rejection of the request for transaction authorization, the method 900 proceeds to step 960 (described below).

In one or more embodiments, the automated teller machine 110 may not receive a signal from the automated teller machine switch 120. For example, the automated teller machine 110 may wait for a signal from the automated teller machine switch 120 for a predefined amount of time such as for example five (5) seconds, ten (10) seconds, thirty seconds (30), etc. In the event that no signal has been received from the automated teller machine switch 120 within the predefined amount of time, the automated teller machine 110 may determine that sending the signal that includes the request for transaction authorization approval has timed out. As such, the method 900 includes determining that sending the signal that includes the request for transaction authorization approval has timed out (step 950).

Responsive to determining that sending the signal that includes the request for transaction authorization approval has timed out, the method 900 proceeds to step 960 (described below).

As mentioned, in response to receiving the signal that includes the indication of rejection of the request for the transaction authorization or in response to determining that sending the signal that includes the request for transaction authorization approval has timed out, the automated teller machine 110 performs operations to cancel the image approval. As such, the method 900 includes sending, to the server computer system, a signal that includes a request to cancel acceptance of the image of the cheque (step 960).

The automated teller machine 110 sends the signal that includes the request to cancel the acceptance of the image of the cheque to the server computer system 130. Since operations to obtain acceptance of the image of the cheque and operations to obtain transaction authorization approval are performed simultaneously, the automated teller machine 110 is able to cancel the acceptance of the image of the cheque when it is determined that the transaction authorization has been rejected or when it is determined that the request has timed out.

The method 900 includes marking the cheque (step 970).

The cheque may be marked in a manner associated with whether or not transaction authorization has been received. For example, the automated teller machine 110 may stamp the cheque with a first indicator that indicates that the transaction authorization has been approved, with a second indicator that indicates that the transaction authorization has been rejected, or with a third indicator that indicates that sending the request for transaction authorization approval has timed out. In one or more embodiments, the cheque may only be marked by the automated teller machine 110 if the transaction authorization has been approved. In this embodiment, the cheque may be re-inserted into the automated teller machine 110 in an attempt to complete the deposit and this may be done in the event that the transaction authorization was rejected or if sending the request for transaction authorization approval has timed out. Other examples of marks that may be used to mark the cheque include punching one or more holes in the cheque, printing a visible or invisible watermark on the cheque, etc.

The method 700 includes returning the cheque (step 740).

Referring back to FIG. 7, once the simultaneous operations to obtain acceptance of the image of the cheque and to obtain transaction authorization approval have completed, the automated teller machine 110 returns the cheque. The cheque may be returned via the item receiver/dispenser 240. As mentioned, the cheque may be marked and as such the cheque may be returned with marks identifying whether or not the image of the cheque was accepted and with marks identifying whether or not transaction authorization was approved. In the event that one or more of the operations performed during step 730 was rejected or timed out, the automated teller machine 110 may analyze cheque to identify the marks and to determine what operations need to be performed to complete the deposit.

In one or more embodiments, the cheque may only be marked in the event that the image of the cheque was accepted and may only be marked in the event that transaction authorization was approved. As such, the cheque may be returned without marks in the event that the image of the cheque was rejected (or if the request timed out) and/or in the event that transaction authorization was rejected (or if the request timed out). In this manner, the returned cheque may be re-inserted into the automated teller machine 110 in an attempt to deposit the cheque.

The automated teller machine 110 performs simultaneous operations to obtain acceptance of an image of a cheque and to obtain transaction authorization approval in real-time or near real-time and in this manner the automated teller machine 110 is able to return the cheque to the user during a session with the automated teller machine 110. This eliminates the requirement of having to clear cassettes holding deposited cheques at the automated teller machine 110. Further, the automated teller machine 110 is able to reverse or cancel transactions in the case of a failure or time out of either the transaction authorization or the accepting of the cheque.

It will be appreciated that the automated teller machine 110 may receive a number of cheques for deposit and each cheque may be processed in manners similar to that described herein. For example, the automated teller machine 110 may receive thirty (30) cheques and may process each cheque separately in manners similar to that described herein.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. An automated teller machine comprising:
a communications module;
an image module;
at least one processor; and
a memory coupled to the at least one processor storing instructions that, when executed by the at least one processor, configure the at least one processor to:
receive a first cheque for deposit;
engage the image module to capture an image of the first cheque;
analyze the image using an optical character recognition module to generate first metadata associated with the first cheque;
send, via the communications module and to a server computer system, a signal that includes the first metadata and the image of the first cheque for acceptance;
receive, via the communications module and from the server computer system, a signal that includes an indication of acceptance of the image of the first cheque based at least on a comparison of second metadata generated by the server computer system by analyzing the image of the first cheque and the first metadata; and
responsive to receiving the signal that includes the indication of acceptance of the image of the first cheque:
mark the first cheque with at least one mark indicating image acceptance; and
return the first cheque.

2. The automated teller machine of claim 1, wherein the at least one mark indicating image acceptance includes an identifier indicating image acceptance.

3. The automated teller machine of claim 1, wherein the instructions, when executed by the at least one processor, further configure the at least one processor to:
send, via the communications module and to an automated teller machine switch, a signal that includes a request for transaction authorization based on the first cheque; and
receive, via the communications module and from the automated teller machine switch, a signal that indicates transaction authorization approval based on the first cheque.

4. The automated teller machine of claim 3, wherein the instructions, when executed by the at least one processor, further configure the at least one processor to:
responsive to receiving the signal that indicates transaction authorization approval based on the first cheque:
mark the first cheque with at least one mark indicating transaction authorization approval.

5. The automated teller machine of claim 3, wherein the signal that includes the request for transaction authorization based on the first cheque is sent simultaneously with the signal that includes the image of the first cheque for acceptance.

6. The automated teller machine of claim 1, wherein the instructions, when executed by the at least one processor, further configure the at least one processor to:
send, via the communications module and to an automated teller machine switch, a signal that includes a request for transaction authorization based on the first cheque; and
receive, via the communications module and from the automated teller machine switch, a signal that indicates transaction authorization rejection or failure based on the first cheque.

7. The automated teller machine of claim 6, wherein the instructions, when executed by the at least one processor, further configure the at least one processor to:
responsive to receiving the signal that indicates transaction authorization rejection or failure based on the first cheque:
mark the first cheque with at least one mark indicating transaction authorization rejection or failure.

8. The automated teller machine of claim 1, wherein the instructions, when executed by the at least one processor, further configure the at least one processor to:
receive a second cheque for deposit;
engage the image module to capture an image of the second cheque;
send, via the communications module and to the server computer system, a signal that includes the image of the second cheque for acceptance; and
receive, via the communications module and from the server computer system, a signal that includes an indication of rejection of the image of the second cheque.

9. The automated teller machine of claim 8, wherein the instructions, when executed by the at least one processor, further configure the at least one processor to:
send, via the communications module and to an automated teller machine switch, a signal that includes a request to cancel a request for transaction authorization based on the second cheque.

10. The automated teller machine of claim 8, wherein responsive to receiving the signal that includes the indication of rejection of the image of the second cheque, the instructions, when executed by the at least one processor, further configure the at least one processor to:
mark the second cheque with at least one mark indicating image rejection.

11. A computer-implemented method executed by a processor of an automated teller machine, the method comprising:
receiving a first cheque for deposit;
engaging an image module to capture an image of the first cheque;
analyzing the image using an optical character recognition module to generate first metadata associated with the cheque;
sending, via a communications module and to a server computer system, a signal that includes the first metadata and the image of the first cheque for acceptance;
receiving via the communications module and from the server computer system, a signal that includes an indication of acceptance of the image of the first cheque based at least on a comparison of second metadata generated by the server computer system by analyzing the image of the first cheque and the first metadata; and
responsive to receiving the signal that includes the indication of acceptance of the image of the first cheque;
marking the first cheque with at least one mark indicating image acceptance; and
returning the first cheque.

12. The computer-implemented method of claim 11, wherein the at least one mark indicating image acceptance includes an identifier indicating image acceptance.

13. The computer-implemented method of claim 11, further comprising:
sending, via the communications module and to an automated teller machine switch, a signal that includes a request for transaction authorization based on the first cheque; and
receiving, via the communications module and from the automated teller machine switch, a signal that indicates transaction authorization approval based on the first cheque.

14. The computer-implemented method of claim 13, further comprising:
responsive to receiving the signal that indicates transaction authorization approval based on the first cheque:
marking the first cheque with at least one mark indicating transaction authorization approval.

15. The computer-implemented method of claim 13, wherein the signal that includes the request for transaction authorization based on the first cheque is sent simultaneously with the signal that includes the image of the first cheque for acceptance.

16. The computer-implemented method of claim 11, further comprising:
sending, via the communications module and to an automated teller machine switch, a signal that includes a request for transaction authorization based on the first cheque; and
receiving, via the communications module and from the automated teller machine switch, a signal that indicates transaction authorization rejection or failure based on the first cheque.

17. The computer-implemented method of claim 16, further comprising:

responsive to receiving the signal that indicates transaction authorization rejection or failure based on the first cheque:
marking the first cheque with at least one mark indicating transaction authorization rejection or failure.

18. The computer-implemented method of claim 11, further comprising:
receiving a second cheque for deposit;
engaging the image module to capture an image of the second cheque;
sending, via the communications module and to the server computer system, a signal that includes the image of the second cheque for acceptance;
receiving, via the communications module and from the server computer system, a signal that includes an indication of rejection of the image of the second cheque; and
responsive to receiving the signal that includes the indication of rejection of the image of the second cheque:
marking the second cheque with at least one mark indicating image rejection.

19. The computer-implemented method of claim 18, further comprising:
sending, via the communications module and to an automated teller machine switch, a signal that includes a request to cancel a request for transaction authorization based on the second cheque.

20. A non-transitory computer-readable storage medium storing instructions that, when executed by a processor of an automated teller machine, cause the automated teller machine to:
receive a first cheque for deposit;
engage an image module to capture an image of the first cheque;
analyze the image using an optical character recognition module to generate first metadata associated with the cheque;
send, via a communications module and to a server computer system, a signal that includes the first metadata and the image of the first cheque for acceptance;
receive, via the communications module and from the server computer system, a signal that includes an indication of acceptance of the image of the first cheque based at least on a comparison of second metadata generated by the server computer system by analyzing the image of the first cheque and the first metadata; and
responsive to receiving the signal that includes the indication of acceptance of the image of the first cheque:
mark the first cheque with at least one mark indicating image acceptance; and;
return the first cheque.

* * * * *